United States Patent
Casty et al.

(10) Patent No.: US 8,163,854 B2
(45) Date of Patent: Apr. 24, 2012

(54) PREPARATION OF SUPPORTED SILYL-CAPPED SILICA-BOUND ANION ACTIVATORS AND ASSOCIATED CATALYSTS

(75) Inventors: Gary L. Casty, Easton, PA (US); George Rodriguez, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 32 days.

(21) Appl. No.: 12/886,146

(22) Filed: Sep. 20, 2010

(65) Prior Publication Data

US 2011/0015357 A1 Jan. 20, 2011

Related U.S. Application Data

(62) Division of application No. 12/144,424, filed on Jun. 23, 2008, now Pat. No. 7,847,038.

(60) Provisional application No. 60/959,468, filed on Jul. 13, 2007.

(51) Int. Cl.
*C08F 4/52* (2006.01)

(52) U.S. Cl. ...................................................... 526/129

(58) Field of Classification Search ................... 526/129
See application file for complete search history.

(56) References Cited

U.S. PATENT DOCUMENTS

| | | | |
|---|---|---|---|
| 5,643,847 A * | 7/1997 | Walzer, Jr. | ................... 502/117 |
| 5,939,347 A | 8/1999 | Ward et al. | |
| 6,087,293 A | 7/2000 | Carnahan et al. | |
| 6,184,171 B1 | 2/2001 | Shih | |
| 6,433,111 B1 | 8/2002 | Kristen et al. | |
| 6,903,148 B2 | 6/2005 | Suzuki et al. | |
| 2005/0070675 A1 | 3/2005 | Wang | |

FOREIGN PATENT DOCUMENTS

| | | |
|---|---|---|
| DE | 199 43 936 | 3/2000 |
| WO | WO00/04059 | 1/2000 |

OTHER PUBLICATIONS

Piers et al., "$B(C_6F_5)_3$-Catalyzed Silation of Alcohols: A Mild, General Method for Synthesis of Silyl Ethers", Journal of Organic Chemistry, 1999, vol. 64, pp. 4887-4892.

* cited by examiner

*Primary Examiner* — Ling Choi
*Assistant Examiner* — Sonya Wright
(74) *Attorney, Agent, or Firm* — Catherine L. Bell

(57) ABSTRACT

A method for the preparation of olefin polymerization catalysts that are the reaction products of the catalytic reaction of surface hydroxyls of a support with a trialkyl silane to afford hydrogen and the corresponding surface bound alkyl silyl ether and at the same time with a strong Lewis acid which support is converted to a silica bound anion that in a second step is fully converted by reaction with $QM_2$ to the desired catalyst. Catalyst compositions are disclosed herein. Processes disclosed herein include processes for the polymerization of olefinically unsaturated monomers comprising contacting a plurality of one or more of the monomers with the catalyst.

22 Claims, 2 Drawing Sheets

Percent Carbon Versus mmol Et$_3$SiH

Anchored Silane on 952 versus Theoretical mmol Et$_3$Si Anchored Versus Et$_3$SiH Offered 952 SiO2 actual vs offered cap mmol TRIS (tris(perfluorophenyl)boron) Versus $Et_3Si$-capped $SiO_2$ Sample Average PP Productivity Versus Activated Catalyst Supported On Varying Amount of Silyl-Capped Supported Activators

US 8,163,854 B2

PREPARATION OF SUPPORTED SILYL-CAPPED SILICA-BOUND ANION ACTIVATORS AND ASSOCIATED CATALYSTS

PRIORITY CLAIM

This application is a divisional of U.S. Ser. No. 12/144,424, filed Jun. 23, 2008 now U.S. Pat. No. 7,847,038, which claims priority to and the benefit of U.S. Ser. No. 60/959,468, filed Jul. 13, 2007.

BACKGROUND OF THE INVENTION

1. Field of the Disclosure

This disclosure generally relates to a method of preparation of compositions of supported ionic catalyst systems that are useful for additions of olefinically unsaturated monomers, e.g., polymerization, wherein the catalyst system is synthesized from a novel supported activator. This disclosure is useful in coordination polymerization processes that utilize supported compounds as for gas phase or slurry polymerization of olefinically unsaturated monomers. This disclosure is useful for polymerization processes using the compositions. The catalyst compositions comprise: a) a metal oxide support; b) silyl-capping of this support in order to reduce the number of available surface hydroxyls; c) formation of a silica-bound anion derived from this silylated support; and d) activation of a metallocene or olefin polymerization precursor catalyst.

2. Detailed Description of the Prior Art

Coordination polymerization of olefinically unsaturated monomers is well known and has led to a proliferation of elastomeric and plastic compositions of matter, such as polyethylene, polypropylene and ethylene/propylene copolymers. The early work utilized transition metal compounds with such activators as aluminum alkyls. Later work extended this to bulky transition metals ("metallocenes") (e.g., $\eta^5$-cyclopentadienyl) with such activators as alkyl alumoxanes. More recent developments have shown the effectiveness of ionic catalysts comprised of metallocene cation activated by non-coordinating anions. Group 13 based Lewis acids having fluorinated aryl substitutents are known to be capable of activating transition metal compounds into olefin polymerization catalysts. Trisperfluorophenylborane, for example, is capable of ionizing cyclopentadienyl derivatives of transition metals by abstracting a ligand and providing a stabilizing, compatible non-coordinating anion. The term "non-coordinating anion" is accepted terminology in the field of olefinic polymerization, both by coordination or insertion polymerization and carbocationic polymerization. The non-coordinating anions are described to function as electronic stabilizing co-catalysts, or counterions, for cationic metallocene complexes that are active for olefin polymerization. Non-coordinating anions as used herein applied both to non-coordinating anions and to coordinating anions that are at most weakly coordinated to the cationic complexes so as to be labile to replacement by unsaturated monomers such as olefinically or acetylenically unsaturated monomers. The use of ionic catalysts for polymerization of unsaturated monomers where organometallic transition metal cations are stabilized in an active polymerization state by compatible, non-coordinating anions is a well-recognized field in the chemical industry. Typically, such organometallic transition metal cations are the chemical derivatives of organometallic transition metal compounds having both ancillary ligands to help stabilize the compound in an active electropositive state and labile ligands including at least one of which that can be abstracted to render the compound cationic and at least one of which that is suitable for olefin insertion. Inert supports are industrially employed for insertion polymerization processes in both slurry and gas phase polymerization, technology for supporting these ionic catalysts is also known.

The chemical bonding of non-coordinating anionic activators to supports so as to prepare polyanionic activators that when used with the metallocene precursor compounds avoid problems of catalyst desorption experience when ionic catalysts physically adsorbed on metal oxide supports are utilized in slurry or solution polymerizations. Detailed description of silica-bound anion technology is discussed in U.S. Pat. No. 5,643,847 and is incorporated herein by reference.

Accordingly, the preparation of supported polymerization catalyst systems in many instances requires the control of the number of available surface hydroxyl groups. A conventional means of reducing the number of surface hydroxyls is to heat the silica support in an inert atmosphere to an elevated temperature (600° C. for example), chosen based on the degree of dehydroxylation desired, hence, reducing the number of available hydroxyl groups for subsequent reactions. At times thermal dehydroxylation is utilized in conjunction with additional methods of reducing available hydroxyl groups. For example, one means of further reducing the number of hydroxyl groups is to fluoride the support by means of a conventional fluoriding agent, in order to adjust the hydroxyl count into the desired range. Fluoriding of metal oxide supports is a well known technique to those skilled in the art. Other means of effectively reducing the availability of surface hydroxyls are known in the literature (Vansant, E. F.; Van Der Voort, P.; and Vrancken, K. C. "Characterization and Chemical Modification of the Silica Surface". Elsevier Science B. V., 1995). These surface modifications can be costly or not practical from a catalyst scale-up perspective.

There is a continuing need for improvements in the method of preparation of effective polymerization catalysts of the type described above. In particular there is a need for procedures with fewer steps and with more control of the stoichiometry such that an optimum number of surface hydroxyl groups are made available for conversion to a silica-bound anion.

The present disclosure employs an alternative route to efficiently decrease the number of surface hydroxyl groups, thus avoiding the use of a costly fluoriding step, described by Piers, W. E. et al., in the Journal of Organic Chemistry 1999, 64, 4887, which is incorporated herein by reference. Importantly, the present disclosure provides for a practical one-pot synthesis of the final catalyst formulation by conducting the silane capping (hydroxyl reduction), activator formation and catalyst activation in one pot. The present inventors have developed a novel process whereby the fluoriding step can be eliminated and wherein dehydroxylating can take place at the reduced temperatures, thus resulting in substantial energy savings as well.

SUMMARY OF THE INVENTION

A method for the preparation of a supported polymerization catalyst comprising the steps of: (1) reducing the number of surface hydroxyl groups by reaction with a trialkylsilane catalyzed by a strong Lewis acid, (2) formation of a silica-bound anion (i.e., a supported catalyst activator) via reaction with a tris[pentafluorophenyl]boron and a tertiary amine, and (3) subsequent activation of the catalyst by the reaction of this supported catalyst activator with the olefin polymerization catalyst precursor, such as Qme$_2$ (rac-dimethylsilylbis[(2-methyl-4-phenyl)indenyl]zirconium dimethyl), wherein steps (1) and (2) are preferably conducted in a single pot reaction to form a supported silyl-capped silica-bound anion activator and, most preferably, that all steps are conducted in one pot reaction process.

A method for the preparation of a supported catalyst comprising: reacting a metal oxide support with at least one silane compound in the presence of a Lewis acid catalyst, thereby generating a silyl capped support; reacting the silyl capped support with a second Lewis acid, which may be the same or different as the first Lewis acid, and an amine, thereby forming a supported silyl-capped silica-bound anion activator; and reacting the supported silyl-capped silica-bound anion activator with at least one metallocene or olefin polymerization catalyst precursor, thereby forming the supported catalyst. Preferably, each step can be conducted separately, i.e. silane capping; generation of silica-bound anion; and reaction with catalyst precursor, thereby allowing one to change the type of Lewis acid to be anchored. Alternatively, the desired amount of $B(C_6F_5)_3$ for anchoring can be added as the catalyst for the silyl capping step; and then DEA is added by itself to complete the generation of the silica bound anion. The catalyst precursor can then be added to the same pot or reaction vessel after the formation of the silica-bound anion is complete, to afford the final catalyst formulation.

The reaction of said metal oxide support with said silane is conducted at a temperature in the range between about 0 to about 120° C. More preferably, between about 10 to about 100° C., most preferably, between about 50 to about 80° C. The reaction is conducted for a time period in the range between about 0.5 to about 10 hours, but most preferably for the shortest amount of time required for the hydrogen evolution (a by-product of the reaction of the silane with the surface hydroxyl) to stop. The reaction of said metal oxide support with said silane is conducted in the presence of a solvent.

The reaction of the silyl capped support with a Lewis acid and amine is conducted at a temperature in the range between −80° C. to about 150° C., more preferably between 0° C. and 120° C., and most preferably between 20° C. and 100° C. The reaction is conducted for a time period in the range between about 1 minute to about 24 hours, more preferably between 30 minutes and 10 hours, and most preferably between 1 hour and 8 hours. Most preferably, the reaction is conducted until the amount of the Lewis acid in solution is no longer being consumed. The reaction of said silyl capped support with said second Lewis acid and said amine is conducted in the present of a solvent. Any hydrocarbon solvent can be used, preferably, but not limited to, toluene.

Any suitable support or carrier material can be used. The terms "support" or "carrier" used herein are used interchangeably and include any support material, preferably a porous support material, including inorganic or organic support materials. Non-limiting examples of inorganic support materials include inorganic oxides and inorganic chlorides. Other support materials include resinous support materials, such as polystyrene, functionalized or crosslinked organic supports, such as polystyrene, divinyl benzene, polyolefins, or polymeric compounds, zeolites, talc, clays, or any other organic or inorganic support material and the like, or mixtures thereof. Preferably, the support material is porous, for example, talc, silica, inorganic oxides and inorganic chlorides.

The preferred support materials are inorganic oxides that include those Group 2, 3, 4, 5, 13 or 14 metal oxides. The preferred supports include silica, fumed silica, alumina (see WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. Another useful support is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

In another embodiment, any of the conventionally known inorganic oxide support materials, such as silica, that retain hydroxyl groups after dehydration treatment methods can be used. Both silica and silica containing metal oxide based supports, for example, silica-alumina, are preferred. Silica particles, gels and glass beads are most typical.

In another embodiment, the support is a polymeric support, including hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the aluminum is protonated and replaced by the polymer incorporated functionality. See, for example, the functional group containing polymers of U.S. Pat. No. 5,288,677.

It is preferred that the support materials have a surface area in the range of from about 10 m²/g to about 700 m²/g, pore volume in the range of from about 0.1 to about 4.0 cc/g and average particle size in the range of from about 5 μm to about 500 μm. More preferably, the surface area of the support material is in the range of from about 50 m²/g to about 500 m²/g, pore volume of from about 0.5 to about 3.5 cc/g and average particle size of from about 10 μm to about 200 μm. The average pore size of the carrier is typically in the range of from 10 Angstroms to 1000 Angstroms, preferably 50 Angstroms to about 500 Angstroms, and most preferably 75 Angstroms to about 350 Angstroms.

Non-porous supports may also be used as supports in the processes described herein. For example, in a preferred embodiment the nonporous, fumed silica supports described in U.S. Pat. No. 6,590,055 can be used in the practice of this invention.

Additional useful supports for use in the processes of this invention include clays that have been treated with acids (such as $H_2SO_4$) as described in U.S. Pat. No. 6,531,552 and EP 1 160 261 A1, which is incorporated by reference herein.

The first and/or second Lewis acid is preferably chosen from tris(perfluorophenyl)boron.

Other Lewis acids that can be used in the present disclosure are described by the general formula:

$$R_xB(ArHal)_{3-x},$$

where x can equal 0, 1, 2, or 3. R is a monoanionic ligand, B is boron and ArHal is a halogenated $C_6$ aromatic or higher carbon number polycyclic aromatic hydrocarbon or aromatic ring assembly in which two or more rings or fused ring systems are joined directly to one another or together. Suitable R ligands may be chosen from hydride; substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, aryl, haloaryl, hydrocarbyl or halocarbyl substituted organometalloid, or other anionic substitutents; fluoride; bulky alkoxides, or, $C_1$ to $C_{30}$ hydrocarbyl substituted organometalloid, such as trimethylsilyl. Examples of ArHal include perfluorinated versions of phenyl, naphthyl and anthracenyl radicals. Non-limiting examples of ArHal groups are: pentafluorophenyl, 2,3,4,5-tetrafluorophenyl, 2,3,4,6-tetrafluorophenyl, 2,3,5,6-tetrafluorophenyl, 2,3,4-trifluorophenyl, 2,3-difluorophenyl, 2,4-difluorophenyl, 2,5-difluorophenyl, 2,6-difluorophenyl, 3,4-difluorophenyl, 2,5-difluorophenyl, 2,3,5,6 tetrafluoro-4-(pentafluorophenyl)phenyl, 2,4,5,6 tetrafluoro-3-(pentafluorophenyl)phenyl, 2,4,6-trifluoro-3,5-bis(pentafluorophenyl)phenyl, 2,3,4,5-tetrafluoro-6-methylphenyl, 2,3,4,5-tetrafluoro-6-ethylphenyl, 2,3,4,5-tetrafluoro-6-propylphenyl, 2,3,4,5-tetrafluoro-6-butylphenyl, 2,3,4,5-tetrafluoro-6-perfluoromethylphenyl, 2,3,4,5-tetrafluoro-6-perfluoroethylphenyl, 2,3,4,5-tetrafluoro-6-perfluoropropylphenyl, 2,3,4,5-tetrafluoro-6-perfluorobutylphenyl, 2,3,4,5-tetrafluoro-6-difluoromethylphenyl, 2,3,4,5-tetrafluoro-6-difluoroethylphenyl, 2,3,4,5-tetrafluoro-6-difluoropropylphenyl, 2,3,4,5-tetrafluoro-6-difluorobutylphenyl, 2,3,4,5-tetrafluoro-6-trifluoroethylphenyl, 2,3,4,5-tetrafluoro-6-trifluoropropylphenyl, 2,3,4,5-tetrafluoro-6-trifluorobutylphenyl, 2,3,4,5-tetrafluoro-6-tetrafluoroethylphenyl, 2,3,4,5-tetrafluoro-6-tetrafluoropropylphenyl, 2,3,4,5-tetrafluoro-6-tetrafluorobutylphenyl, 2,3,4,6-tetrafluoro-5-methylphenyl, 2,3,4,6-tetrafluoro-5-ethylphenyl, 2,3,4,6-tetrafluoro-5-propylphenyl, 2,3,4,6-tetrafluoro-5-butylphenyl, 2,3,4,6-tetrafluoro-5-difluoromethylphenyl, 2,3,4,6-tetrafluoro-5-difluoroethylphenyl, 2,3,4,6-tetrafluoro-5-difluoropropylphenyl, 2,3,4,6-tetrafluoro-5-difluorobutylphenyl, 2,3,4,6-tetrafluoro-5-trifluoromethylphenyl, 2,3,4,6-tetrafluoro-5-trifluoroethylphenyl, 2,3,4,6-tetrafluoro-5-trifluoropropylphenyl, 2,3,4,6-tetrafluoro-5-trifluorobutylphenyl, 2,3,4,6-tetrafluoro-5-tetrafluoroethylphenyl, 2,3,4,6-tetrafluoro-5-tetrafluoropropylphenyl, 2,3,4,6-tetrafluoro-5-perfluorobutylphenyl, 2,3,4,6-tetrafluoro-5-perfluoroethylphenyl, 2,3,4,6-tetrafluoro-5-perfluoropropylphenyl, 2,3,4,6-tetrafluoro-5-perfluorobutylphenyl, 2,3,5,6-tetrafluoro-4-methylphenyl, 2,3,5,6-tetrafluoro-4-ethylphenyl, 2,3,5,6-tetrafluoro-4-propylphenyl, 2,3,5,6-tetrafluoro-4-butylphenyl, 2,3,5,6-tetrafluoro-4-difluoromethylphenyl, 2,3,5,6-tetrafluoro-4-difluoroethylphenyl, 2,3,5,6-tetrafluoro-4-difluoropropylphenyl, 2,3,5,6-tetrafluoro-4-difluorobutylphenyl, 2,3,5,6-tetrafluoro-4-trifluoromethylphenyl, 2,3,5,6-tetrafluoro-5-trifluoroethylphenyl, 2,3,5,6-tetrafluoro-5-trifluoropropylphenyl, 2,3,5,6-tetrafluoro-4-trifluorobutylphenyl, 2,3,5,6-tetrafluoro-4-tetrafluoroethylphenyl, 2,3,5,6-tetrafluoro-4-tetrafluoropropylphenyl, 2,3,5,6-tetrafluoro-4-perfluorobutylphenyl, 2,3,5,6-tetrafluoro-4-perfluoroethylphenyl, 2,3,5,6-tetrafluoro-5-perfluoropropylphenyl, 2,3,5,6-tetrafluoro-5-perfluorobutylphenyl, heptafluoro-1-naphth-2-yl, heptafluoronaphth-2-yl, 1,3,4,5,6,7-hexafluoronaphth-8-methyl-2-yl, 1,3,4,5,6,7-hexafluoronaphth-8-ethyl-2-yl, 1,3,4,5,6,7-hexafluoronaphth-8-propyl-2-yl, 1,3,4,5,6,7-hexafluoronaphth-8-butyl-2-yl, 1,3,4,5,6,7-hexafluoronaphth-8-isopropyl-2-yl, 1,3,4,5,6,7-hexafluoronaphth-8-isobutyl-2-yl, 1,3,4,5,6,8-hexafluoronaphth-7-methyl-2-yl, 1,3,4,5,6,8-hexafluoronaphth-7-ethyl-2-yl, 1,3,4,5,6,8-hexafluoronaphth-7-propyl-2-yl, 1,3,4,5,6,8-hexafluoronaphth-7-butyl-2-yl, 1,3,4,5,6,8-hexafluoronaphth-7-isopropyl-2-yl, 1,3,4,5,6,8-hexafluoronaphth-7-isobutyl-2-yl, 1,3,4,5,7,8-hexafluoronaphth-6-methyl-2-yl, 1,3,4,5,7,8-hexafluoronaphth-6-ethyl-2-yl, 1,3,4,5,7,8-hexafluoronaphth-6-propyl-2-yl, 1,3,4,5,7,8-hexafluoronaphth-6-butyl-2-yl, 1,3,4,5,7,8-hexafluoronaphth-6-isopropyl-2-yl, 1,3,4,5,7,8-hexafluoronaphth-6-isobutyl-2-yl, 1,3,4,6,7,8-hexafluoronaphth-5-methyl-2-yl, 1,3,4,6,7,8-hexafluoronaphth-5-ethyl-2-yl, 1,3,4,6,7,8-hexafluoronaphth-5-propyl-2-yl, 1,3,4,6,7,8-hexafluoronaphth-5-butyl-2-yl, 1,3,4,6,7,8-hexafluoronaphth-5-isopropyl-2-yl, 1,3,4,6,7,8-hexafluoronaphth-5-isobutyl-2-yl, 1,3,5,6,7,8-hexafluoronaphth-4-methyl-2-yl, 1,3,5,6,7,8-hexafluoronaphth-4-ethyl-2-yl, 1,3,5,6,7,8-hexafluoronaphth-4-propyl-2-yl, 1,3,5,6,7,8-hexafluoronaphth-4-butyl-2-yl, 1,3,5,6,7,8-hexafluoronaphth-4-isopropyl-2-yl, 1,4,5,6,7,8-hexafluoronaphth-4-isobutyl-2-yl, 1,4,5,6,7,8-hexafluoronaphth-3-methyl-2-yl, 1,4,5,6,7,8-hexafluoronaphth-3-ethyl-2-yl, 1,4,5,6,7,8-hexafluoronaphth-3-propyl-2-yl, 1,4,5,6,7,8-hexafluoronaphth-3-butyl-2-yl, 1,4,5,6,7,8-hexafluoronaphth-3-isopropyl-2-yl, 1,4,5,6,7,8-hexafluoronaphth-3-isobutyl-2-yl, 3,4,5,6,7,8-hexafluoronaphth-1-methyl-2-yl, 3,4,5,6,7,8-hexafluoronaphth-1-ethyl-2-yl, 3,4,5,6,7,8-hexafluoronaphth-1-propyl-2-yl, 3,4,5,6,7,8-hexafluoronaphth-1-butyl-2-yl, 3,4,5,6,7,8-hexafluoronaphth-1-isopropyl-2-yl, 3,4,5,6,7,8-hexafluoronaphth-1-isobutyl-2-yl, The first and/or second Lewis acid is chosen from any Lewis acid as described by Jensen, W. B. in *Chemical Reviews* 78, 1-22 (1978) and references therein as well as by Jensen, W. B. in "The Lewis Acid-Base Concept", Wiley, New York, 1980; both of which are fully incorporated herein by reference. More specifically, the first and/or second Lewis acid is chosen from neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, preferably fluorinated, aryl groups. Alternately, the neutral stoichiometric activator is trisperfluorophenyl boron or trisperfluoronapthyl boron.

The amine can be chosen from any Lewis or Bronsted base capable of deprotonating an acid. More preferably, the amine is chosen from, but not limited to, any tertiary amine. Most preferably, the amine is chosen from, but not limited to any analine-type structures. An example of an appropriate amine, but not limited to, is diethylanaline.

The catalyst precursor can be chosen from any catalyst precursor capable of producing isotactic polypropylene. An example of an appropriate catalyst precursor, but not limited to, is rac-dimethylsilylbis[(2-methyl-4-phenyl]zirconium-dimethyl. The supported silyl-capped silica-bound anion activator is preferably trialkylsilyl-capped silica-bound anion.

The silane compound is trialkylsilane. In a preferred embodiment, the trialkylsilane is triethylsilane. However, the silane can be described from the general formula:

$$H_xSi(R)_{4-x}$$

wherein x must equal at least 1, but may be 2 or 3 or 4. R can be any hydrido, alkyl, aryl, heteroalkyl, or heteroaryl ligand. Furthermore, it is required that at least one hydride ligand be bound to silicon. Moreover, the silyl capping agent can be a monomer, dimer, trimer, tetramer, oligomer or polymer. Non-limiting examples are:
Methylsilane
Dimethylsilane
Trimethylsilane
Ethylsilane
Diethylsilane
Propylsilane
Di(n-propyl)silane
Tri(n-propyl)silane
Phenylsilane
Diphenylsilane
Triphenylsilane
Diethylphenylsilane
Ethyldiphenylsilane
Diethylperfluorophenylsilane
trisperfluorophenylsilane The silyl capped support comprises a trialkylsilyl content of between about 1 to about 99% of the available surface hydroxyl group.

A polymerization process comprising contacting one or more monomers polymerizable by coordination polymerization under suitable polymerization conditions with a polymerization catalyst formed by the method comprising: reacting a metal oxide support with at least one silane compound in the presence of a first Lewis acid, thereby generating a silyl capped support; reacting the silyl capped support with a second Lewis acid, which may be the same or different as the first Lewis acid, and an amine, thereby forming a supported silyl-capped silica-bound anion activator; and reacting the supported silyl-capped silica-bound anion activator with at least one metallocene precursor, thereby forming the polymerization catalyst.

A method for the preparation of a supported silyl-capped silica-bound anion activator comprising: reacting a metal oxide support with at least one silane compound in the presence of a first Lewis acid, thereby generating a silyl capped support; and reacting the silyl capped support with a second Lewis acid, which may be the same or different as the first Lewis acid, and an amine, thereby forming a supported silyl-capped silica-bound anion activator.

In another embodiment the present disclosure relates to a supported olefin polymerization catalyst characterized by having a reaction product comprising reducing the number of surface hydroxyl groups by reaction of the support with a trialkylsilane catalyzed by a strong Lewis acid and by formation of a silica-bound anion via reaction with a tris[pentafluorophenyl]boron and a tertiary amine, and reaction of the silica-bound anion product above with the catalyst precursor, for example, rac-dimethylsilylbis[(2-methyl-4-phenyl]zirconiumdimethyl, $QMe_2$.

In yet another embodiment of this disclosure a polymerization process characterized by comprising contacting one or more monomers polymerizable by coordination polymerization under suitable polymerization conditions with at least one polymerization catalyst characterized by having a reaction product comprising a metal oxide support reacted with a trialkylsilane and with a tertiary amine in the presence of a strong Lewis acid catalyst and by formation of a silica-bound anion via reaction with a tris[pentafluorophenyl]boron and a tertiary amine (i.e. a supported silyl-capped silica-bound anion activator) and reaction of the supported silyl-capped silica-bound anion activator with the catalyst precursor, $QMe_2$.

These and other features and attributes of the disclosed methods, compositions and polymerization processes of the present disclosure and their advantageous applications and/or uses will be apparent from the detailed description which follows.

DETAILED DESCRIPTION OF THE INVENTION

Figure 1:
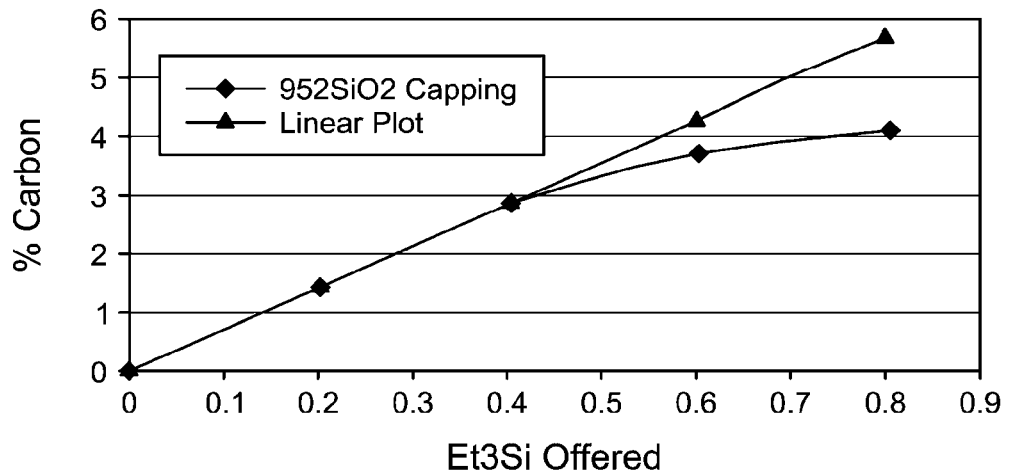
FIG. 1 is a graph plotting percent carbon versus mmol $Et_3SiH$
Figure 2:
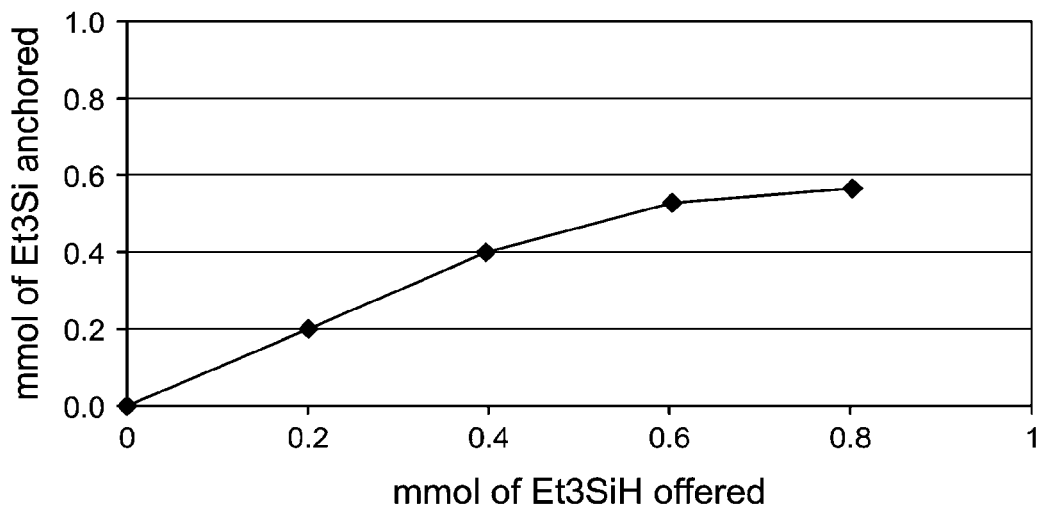
FIG. 2 is a graph plotting mmol $Et_3Si$ anchored versus $Et_3SiH$ offered.

All numerical values herein are understood as modified by "about" to avoid using "about" in front of numerical values throughout the detailed description, and the claims. The following non-limiting embodiments are illustrative of the various forms of the present disclosure. It is within the ability of a person of ordinary skill in the art to select other variables from amongst the many known in the art without departing from the scope of the present disclosure. Accordingly, these embodiments shall serve to further illustrate the present disclosure, not to limit them.

In step (i), the number of available hydroxyl groups on the silica surface is reduced by a Lewis acid catalyzed reaction with triethylsilane as described in The Journal of Organic Chemistry 1999, 64, 4887, as exemplified in the below illustrative equation:

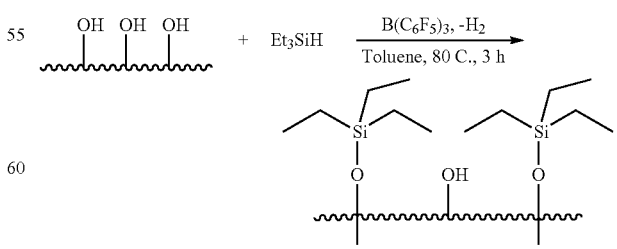

In a step (ii), hydroxyl groups not reacted in step (i) are converted to a silica-bound anion by reaction with tris[pentafluorophenyl]boron $((pfp)_3B)$ and N,N-diethylaniline (DEA) to form a significantly reduced hydroxyl group activator, as exemplified in the below illustrative equation:

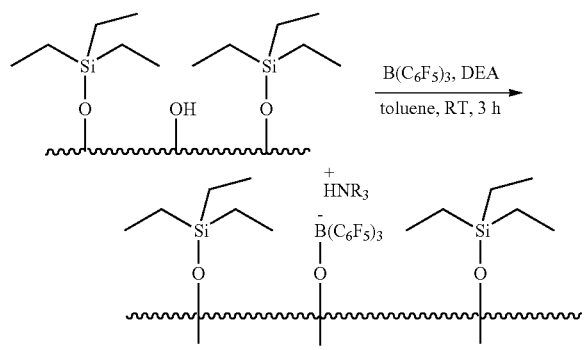

In optional step (iii), the silica-bound anion is treated with a dialkyl (in this case dimethyl) metallocene, generating a metallocenium cation and liberating DEA and methane. This is analogous to processes, in which a metallocene is treated with a discrete activator, such as, dimethylanilinium tetrakis[pentafluorophenyl]borate. In the present system, the metallocenium cation formed is bound ionically to the anion, which in turn is bound covalently to the silica support.

The disclosure describes a method for the preparation of a silica supported olefin polymerization catalyst system. It describes a three step process where in step (1) the number of hydroxyl groups on the silica surface is reduced by a Lewis acid catalyzed reaction with a trialkylsilane. The amount of silane that "caps" or converts the chemically accessible surface hydroxyls depends on the amount of and specific structure of the silane introduced, but does have a limiting value. While methyl, ethyl, n-propyl, i-propyl, n-butyl, sec-butyl, and tert-butyl silanes are viable trialkylsilanes, triethylsilane is an exemplary embodiment of the specific structure of silane. With all stoichiometries tested we found that there remains an amount of surface hydroxyl group that are not converted or "capped".

In step (2) which is preferably carried out in the same reactor vessel or pot, those hydroxyl groups not reacted in step (1) are converted to a silica-bound anion by reaction with an appropriate Lewis acid. The Lewis acid compounds of this disclosure are those olefin catalyst activator Lewis acids based on boron metalloid centers having bulky, electron-withdrawing ligands, such as the halogenated aryl ligands of tris(perfluorophenyl)borane. These bulky ligands should be sufficient to allow the Lewis acids to function as electronically stabilizing, compatible non-coordinating anions. Stable ionic complexes are achieved when the anions are not readily hydrolyzed and will not be a suitable ligand donor to the strongly Lewis acidic cationic organometallic transition metal cations used in insertion polymerization, i.e., inhibit ligand transfer that would neutralize the cations and render them inactive for polymerization. Such Lewis acids are described by the formula:

$$R_xB(ArHal)_{3-x},$$

where R is a monoanionic ligand, B is boron and ArHal is a halogenated $C_6$ aromatic or higher carbon number polycyclic aromatic hydrocarbon or aromatic ring assembly in which two or more rings or fused ring systems are joined directly to one another or together. Suitable R ligands may be chosen from hydride; substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, aryl, haloaryl, hydrocarbyl or halocarbyl substituted organometalloid, or other anionic substitutents; fluoride; bulky alkoxides, or, $C_1$ to $C_{30}$ hydrocarbyl substituted organometalloid, such as trimethylsilyl. Examples of ArHal include perfluorinated versions of phenyl, naphthyl and anthracenyl radicals.

Lewis acid aryl boron compounds according to the above formula can be prepared or synthesized in accordance with methods known in the art. An illustrative example of a Lewis acid aryl boron compound useful in this method is tris(perfluorophenyl)boron ($B(C_6F_5)_3$).

The phrase "non-coordinating anion" as used for the compounds in the disclosure is art recognized to mean an anion that either does not coordinate to the transition metal cation or that is only weakly coordinated to the cation thereby remaining sufficiently labile to be displaced by a neutral Lewis base.

In step (3) of the preparative method of the disclosure, the silica-bound anion formed in step (2) is reacted with a catalyst precursor, for example, rac-dimethylsilylbis[(2-methyl-4-phenyl]zirconiumdimethyl ($QMe_2$).

The processes described herein may use any polymerization catalyst compound or compounds to polymerize unsaturated monomers, including olefin(s). Examples of suitable catalyst compounds include bulky ligand metallocene catalyst compositions, Group 15 atom containing metal polymerization catalyst compositions, and phenoxide transition metal catalyst compositions. The following is a non-limiting discussion of the various polymerization catalysts which may be utilized, the processes described herein.

Bulky Ligand Metallocene Catalyst Compositions

The processes described herein may be used to activate bulky ligand metallocene catalyst compositions. Generally, these catalyst compounds include half and full sandwich compounds having one or more bulky ligands bonded to at least one metal atom. Typical bulky ligand metallocene compounds are described as containing one or more bulky ligand(s) and one or more leaving group(s) bonded to at least one metal atom.

The bulky ligands may be open, acyclic, fused ring(s) or ring system(s), or a combination thereof. The ring(s) or ring system(s) of these bulky ligands are typically composed of atoms selected from Groups 13 to 16 atoms of the Periodic Table of the Elements. Preferably the atoms are selected from the group consisting of carbon, nitrogen, oxygen, silicon, sulfur, phosphorus, germanium, boron and aluminum or a combination thereof. Most preferably the ring(s) or ring system(s) are composed of carbon atoms such as but not limited to those cyclopentadienyl ligands or cyclopentadienyl-type ligand structures. The bulky ligands may also be other similar functioning ligand structure such as pentadiene, a cyclooctatetradienyl or an imide ligand. The metal atom is preferably selected from Group 3 through 15 and the lanthanide or actinide series of the Periodic Table of the Elements. Preferably the metal is a transition metal from Groups 4 through 12, more preferably Groups 4, 5 and 6, and most preferably the transition metal is from Group 4, especially Ti or Zr or Hf.

In one embodiment, the bulky ligand metallocene catalyst compounds, which may be utilized with the processes described herein, may be represented by Formula IV:

$$L^AL^BMQ_n \qquad \text{(Formula IV)}$$

where M is a metal atom from the Periodic Table of the Elements and may be a Group 3 to 12 metal or from the lanthanide or actinide series of the Periodic Table of the Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine (WO 99/40125), pyrrolyl ligands, pyrazolyl ligands, carbazolyl ligands, borabenzene ligands and the like, including hydrogenated versions thereof, for example tetrahydroindenyl ligands. In another embodiment, $L^A$ and $L^B$ may comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other $L^A$ and $L^B$ bulky ligands include but are not porphyrins, phthalocyanines, corrins and other polyazamacrocycles. Independently, each $L^A$ and $L^B$ may be the same or different type of bulky ligand that is bonded to M. In one embodiment of Formula (IV) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorus, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In on embodiment, Q is a monoanionic labile ligand having a sigma-bond to M. Depending on the oxidation state of the metal, the value for n is 0, 1, or 2 or such that Formula (IV) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the processes described herein may be utilized with the bulky ligand metallocene catalyst compounds of Formula (V) where $L^A$ and $L^B$ are bridged to each other by at least one bridging group, A, as represented in Formula V:

$$L^A A L^B M Q_n \qquad \text{(Formula V)}$$

These bridged compounds are known as bridged, bulky ligand metallocene catalyst compounds. $L^A$, $L^B$, M, Q and n are defined above. Non-limiting examples of bridging group A include bridging groups containing at least one Group 13 to 16 atom, often referred to as divalent moiety such as but not limited to as least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group may also contain substituent groups R as defined above including halogens and iron. Non-limiting examples of bridging group A may be represented by $R'_2C$, $R'_2Si$, $R'_2SiR'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula (V) have two or more bridging groups A (EP 664 301 B1).

In another embodiment, the processes described herein may be utilized with bulky ligand metallocene catalyst compounds where the R substituents on the bulky ligands $L^A$ and $L^B$ of Formulas (IV) and (V) are substituted with the same or different number of substituents on each of the bulky ligands. In another embodiment, the bulky ligands $L^A$ and $L^B$ of formulas (IV) and (V) are different from each other.

In another embodiment, the processes described herein may be utilized with other bulky ligand metallocene catalyst compounds such as those described in U.S. Pat. Nos. 5,064,802, 5,145,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are fully incorporated herein by reference.

In another embodiment, the processes described herein may be utilized with bulky ligand metallocene catalysts which include bridged heteroatom, mono-bulky ligand metallocene compounds. These types of catalysts and catalyst systems are described in, for example, PCT publication WO 92/00333, WO 94/07928, WO 91/04257, WO 94/03506, WO 96/00244, WO 97/15602 and WO 99/20637 and U.S. Pat. Nos. 5,057,475, 5,096,867, 5,055,438, 5,198,401, 5,227,440, and 5,264,405 and European publication EP-A-0 420 436, all of which are herein fully incorporated by reference.

In this embodiment, the processes described herein may be utilized with a bulky ligand metallocene catalyst compound represented by Formula VI:

$$L^c AJMQ_n \qquad \text{(Formula VI)}$$

where M is a Group 3 to 12 metal atom or a metal selected from the Group of actinides and lanthanides of the Periodic Table of the Elements, preferably M is a Group 4 to 12 transition metal, and more preferably M is a Group 4, 5 or 6 transition metal, and most preferably M is Group 4 transition metal in any oxidation state, especially Ti or Zr or Hf, $L^c$ is a substituted or unsubstituted bulky ligand bonded to M; J is bonded to M; A is bonded to $L^c$ and J; J is a heteroatom ancillary ligand; and A is a bridging group; Q is a univalent anionic ligand; and n is the integer 0, 1 or 2. In Formula (VI) above, $L^c$, A and J form a fused ring system. In an embodiment, $L^c$ of formula (VI) is as defined above for $L^A$, A, M and Q of formula (VI) are as defined above in formula (V).

In Formula (VI) J is a heteroatom containing ligand in which J is an element with a coordination number of three from Group 15 or an element with a coordination number of two from Group 16 of the periodic Table of the Elements. Preferably J contains a nitrogen, phosphorus, oxygen or sulfur atom with nitrogen being most preferred.

In another embodiment, the processes described herein is utilized with a bulky ligand metallocene catalyst compound which is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the processes described herein is utilized with a ligand metallocene catalyst compound, which may be represented by Formula (VII):

$$L^D MQ_2(YZ)X_n \qquad \text{Formula (VII)}$$

where M is a Group 3 to 16 metal, preferably a Group 4 to 12 transition metal, and most preferably a Group 4, 5 or 6 transition metal; LD is a bulky ligand that is bonded to M; each Q is independently bonded to M and Q2(YZ) forms a uni-charged polydentate ligand; Q is a univalent anionic ligand also bonded to M; X is a univalent anionic group when n is 2 or X is a divalent anionic group when n is 1; n is 1 or 2.

In Formula (VII), L and M are as defined above for Formula (IV). Q is as defined above for Formula (IV), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$ and —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the processes described herein is utilized with a bulky ligand metallocene catalyst compounds, which include heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorus and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539, 124, 5,554,775, 5,756,611, 5,233,049, 5,744,417, and 5,856, 258 all of which are herein incorporated by reference.

In another embodiment, the processes described herein may be utilized with a bulky ligand metallocene catalyst compounds, which include complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the processes described herein may be utilized with a bulky ligand metallocene catalyst compounds which may be represented by Formula (VIII):

$$((Z)XA_t(YJ))_q MQ_n \qquad \text{Formula (VIII)}$$

where M is selected from Group 3 to 13 or lanthanide and actinide series of the Periodic Table of the Elements; Q is bonded to M and each Q is monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y of J, preferably X and J; q is 1 or 2; n is an integer from 1 to 4 depending on the oxidation state of M. In one embodiment, where X is oxygen or sulfur then Z is optional. In another embodiment, where X is nitrogen or phosphorus then Z is present. In an embodiment, Z is preferably an aryl group, more preferably a substituted aryl group.

It is also within the scope of this invention, in one embodiment, that the bulky ligand metallocene catalyst compounds, which may be utilized with the processes described herein include complexes of Ni$^{2+}$ and Pd$^{2+}$ described in the articles Johnson, et al., New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663, and 5,880,241, which are all herein fully incorporated by reference. These complexes can be either dialkyl ether adducts, or alkylated reaction products of the described dihalide complexes that can be activated to a cationic state, may be utilized in the processes described herein.

Also included as bulky ligand metallocene catalyst are those diimine based ligands of Group 8 to 10 metal compounds disclosed in PCT publications WO 96/23010 and WO 97/48735 and Gibson, et al., Chem. Comm., pp. 849-850 (1998), all of which are herein incorporated by reference.

Other bulky ligand metallocene catalysts, which may be utilized with the processes described herein, are those Group 5 and 6 metal imido complexes described in EP-A2-0 816 384 and U.S. Pat. No. 5,851,945, which is incorporated herein by reference. In addition, bridged bis(amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146 which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Group 15 Atom Containing Polymerization Catalysts

The processes described herein may also be utilized with Group 15 atom containing polymerization catalyst compounds. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 and 16 atom through another group.

Preferably, at least one of the Group 15 atoms is also bound to a Group 15 or 16 atom through another group which may be a C1 to C20 hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

Group 15 atom containing metal polymerization catalyst compounds may be represented by Formula (IX) or (X):

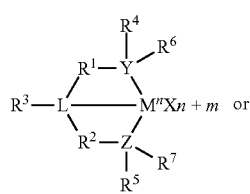

Formula (IX)

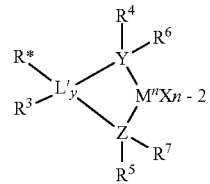

Formula (X)

wherein M is a transition metal, preferably a Group 3 to 14 main group metal, preferably a Group 4, 5, or 6 metal, and more preferably a Group 4 metal, and most preferably zirconium, titanium or hafnium.

Each X is independently a leaving group, preferably an anionic leaving group, and more preferably hydrogen, a hydrocarbyl group, a heteroatom, or a halogen, and most preferably an alkyl or an aryl substituted alkyl;

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group, $R^3$ is absent, a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or a multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, heteroatom containing group.

By "formal charge of the YZL or YZL' ligand", it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

Phenoxide Transition Metal Catalyst Compositions

The processes described herein may also be used with phenoxide transition metal catalyst compounds. Generally, these complexes are heteroatom substituted phenoxide ligated Group 3 to 10 transition metal or lanthanide metal compounds wherein the metal is bound to the oxygen of the phenoxide group.

Phenoxide transition metal catalyst compounds may be represented by Formula XI or XII:

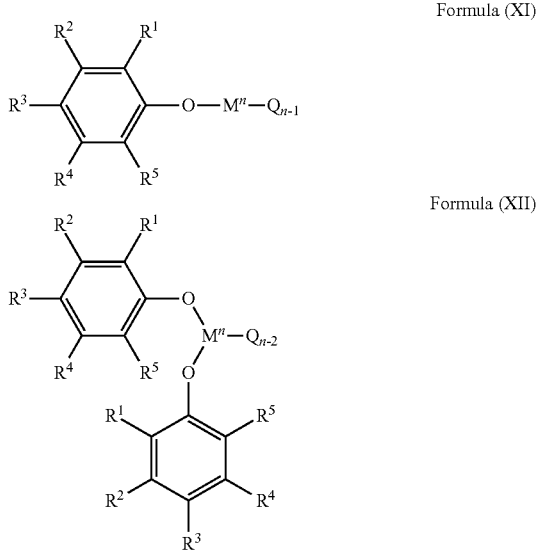

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M;
At least one of $R^2$ to $R^5$ is a heteroatom containing group, the rest of $R^2$ to $R^5$ are independently hydrogen or a $C_1$ to $C_{100}$ group, preferably a $C_4$ to $C_{20}$ alkyl group, preferred examples of which include butyl, isobutyl, t-butyl, pentyl, hexyl, heptyl, isohexyl, octyl, isooctyl, decyl, nonyl, dodecyl, and any of $R^2$ to $R^5$ also may or may not be bound to M;
Each $R^1$ to $R^5$ group may be independently substituted or unsubstituted with other atoms, including heteroatoms or heteroatom containing group(s):
O is oxygen;
M is a Group 3 to Group 10 transition metal or lanthanide metal, preferably a Group 4 metal, preferably M is Ti, Zr or Hf;
n is the valence state of the metal M, preferably 2, 3, 4, or 5; and
Q is, and each Q may be independently be, an alkyl, halogen, benzyl, amid, carboxylate, carbamate, thiolate, hydride or alkoxide group, or a bond to an R group containing a heteroatom which may be any or $R^1$ to $R^5$.

A heteroatom-containing group may be any heteroatom or a heteroatom bound to carbon, silicon or another heteroatom. Preferred heteroatoms include boron, aluminum, silicon, nitrogen, phosphorus, arsenic, tin, lead, antimony, oxygen, selenium, and tellurium. Particularly preferred heteroatoms include nitrogen, oxygen, phosphorus, and sulfur. Even more particularly preferred heteroatoms include nitrogen and oxygen. The heteroatom itself may be directly bound to the phenoxide ring or it may be bound to another atom or atoms that are bound to the phenoxide ring. The heteroatom-containing group may contain one or more of the same or different heteroatoms. Preferred heteroatom containing groups include imines, amines, oxides, phosphines, ethers, ketones, heterocyclics, oxazolines, thioethers, and the like. Particularly preferred heteroatom containing groups include imines. Any two adjacent R groups may form multi-ring structures. In one embodiment any two or more R groups do not form a 5 membered ring.

In a preferred embodiment the heteroatom substituted phenoxide transition metal compound is an iminophenoxide Group 4 transition metal compound, and more preferably and iminophenoxidezirconium compound.

Other Bulky Ligand Metallocene Catalyst Compounds

Other catalysts are those Group 5 and 6 metal imido complexes described in EP-A2-0 816 384 and U.S. Pat. No. 5,851,945 which is incorporated herein by reference. In addition, other catalysts include bridged bis(arylamido) Group 4 compounds described by D. H. McConville, et al., in Organometallics 1995, 14, 5478-5480, which is herein incorporated by reference. Bridged bis(amido) catalyst compounds are described in WO 96/27439, which is herein incorporated by reference may also be utilized with the processes described herein. Other suitable catalysts are described as bis(hydroxy aromatic nitrogen ligands) in U.S. Pat. No. 5,852,146, which is incorporated herein by reference. Other catalysts containing on or more Group 15 atoms include those described in WO 98/26651, which is incorporated herein by reference. Still other catalysts include those multinuclear bulky ligand metallocene catalysts as described in WO 99/20665, which is incorporated herein by reference.

It is also contemplated that in one embodiment, the processes described herein may be utilized with bulky ligand metallocene catalysts including their structural or optical or enantiomeric isomers (meso and racemic isomers, for example see U.S. Pat. No. 5,852,143, incorporated herein by reference) and mixtures thereof.

In another embodiment, it is further contemplated that the polymerization catalysts, described above may be used in combination.

Non-limiting examples of metallocene-type transition metal compounds are chosen from: rac-dimethylsilyl-bis(indenyl)hafniumdimethyl, rac-dimethylsilyl-bis(indenyl)zirconiumdimethyl, rac-dimethylsilyl-bis(2-methyl-4-phenyl-indenyl)hafniumdimethyl, rac-dimethylsilyl-bis(2-methyl-4-phenyl-indenyl)zirconiumdimethyl, rac-dimethylsilyl-bis(2-methyl-benzindenyl)hafniumdimethyl, rac-dimethylsilyl-bis(2-methyl-benzindenyl)zirconiumdimethyl, rac-dimethylsilyl-bis-(2-methyl-indenyl)zirconiumdimethyl, rac-dimethylsilyl-bis-(2-methyl-indenyl)hafniumdimethyl, rac-dimethylsilyl-bis(2-methyl-4-naphthyl-indenyl)hafniumdimethyl, rac-dimethylsilyl-bis(2-methyl-4-naphthyl-indenyl)zirconiumdimethyl, rac-ethylene-bis(indenyl)hafniumdimethyl, rac-ethylene-bis(indenyl)zirconiumdimethyl, rac-dimethylsilyl-bis(2-methyl-4-(2'-methyl-phenyl)-indenyl)hafniumdimethyl, rac-dimethylsilyl-bis(2-methyl-4-(2'-methyl-phenyl)-indenyl)zirconiumdimethyl, rac-dimethylsilyl-bis(2-methyl-4-(4'-methyl-phenyl)-indenyl) hafniumdimethyl, rac-dimethylsilyl-bis(2-methyl-4-(4'-methyl-phenyl)-indenyl)zirconiumdimethyl, rac-dimethylsilyl-bis(2-methyl-4-(4'-tert-butyl-phenyl)-indenyl) hafniumdimethyl, rac-dimethylsilyl-bis(2-methyl-4-(4'-tert-butyl-phenyl)-indenyl)zirconiumdimethyl, rac-dimethylsilyl-bis(2-methyl-4-(4'-tert-butyl-phenyl)-indenyl) hafniumdimethyl, rac-dimethylsilyl-bis(2-methyl-4-(4'-tert-butyl-phenyl)-indenyl)zirconiumdimethyl, rac-dimethylsilyl-(2-methyl-4-(4'-tert-butyl-phenyl)-indenyl)(2-isopropyl-4-(4'-tert-butyl-phenyl)-indenyl)

hafniumdimethyl, rac-dimethylsilyl-(2-methyl-4-(4'-tert-butyl-phenyl)-indenyl)(2-isopropyl-4-(4'-tert-butyl-phenyl)-indenyl)zirconiumdimethyl, rac-dimethylsilyl-bis(2-methyl-4,6-diisopropyl-indenyl)hafniumdimethyl, rac-dimethylsilyl-bis(2-methyl-4,6-diisopropyl-indenyl) zirconiumdimethyl, Bis(cyclopentadienyl) zirconiumdimethyl, Bis(pentamethylcyclopentadienyl) zirconiumdimethyl, Bis(cyclopentadienyl) (pentamethylcyclopentadienyl)zirconiumdimethyl, Bis(1-methyl,4-butylcyclopentadienyl)zirconiumdimethyl, Bis(1-methyl,4-butylcyclopentadienyl)zirconiumdibenzyl, Bis(1-methyl,4-butylcyclopentadienyl)zirconiumdiamide, Bis(1-methyl,4-ethylcyclopentadienyl)zirconiumdimethyl, Bis(1-methyl,4-benzylcyclopentadienyl)zirconiumdimethyl, Bis (1-methyl,3-butylcyclopentadienyl)zirconiumdimethyl, Bis (1-methyl,3-n-propylcyclopentadienyl)zirconiumdimethyl, Bis(1-methyl,3-iso-propylcyclopentadienyl)zirconiumdimethyl, Bis(1,3-dimethylcyclopentadienyl)zirconiumdimethyl, Bis(n-propylcyclopentadienyl)zirconiumdimethyl, Bis (n-propylcyclopentadienyl)zirconiumdiamide, Bis(n-propylcyclopentadienyl)zirconiumdibenzyl, Bis(n-propylcyclopentadienyl)hafniumdimethyl, Bis(n-propylcyclopentadienyl)hafniumdiamide, Bis(n-propylcyclopentadienyl)hafniumdibenzyl, Bis(n-propylcyclopentadienyl)hafniumdimethoxide, Bis(n-butylcyclopentadienyl)zirconiumdimethyl, Bis(tert-butylcyclopentadienyl)zirconiumdimethyl, Bis (benzylcyclopentadienyl)zirconiumdimethyl, Bis (benzylcyclopentadienyl)(pentamethylcyclopentadienyl) zirconiumdimethyl, Bis(propylcyclopentadienyl) (pentamethylcyclopentadienyl)zirconiumdimethyl, Bis (propylcyclopentadienyl)(tetramethylcyclopentadienyl) zirconiumdimethyl, Bis(tetramethyl, propylcyclopentadienyl)(pentamethylcyclopentadienyl) zirconium-dimethyl, Bis(tetramethyl, propylcyclopentadienyl)(cyclopentadienyl) zirconiumdimethyl, Dimethylsilylbis(cyclopentadienyl) zirconiumdimethyl, Dimethylsilylbis(cyclopentadienyl) zirconiumdiamide, Dimethylsilybis (pentamethylcyclopentadienyl)zirconiumdimethyl, Dimethylsilylbis(pentamethylcyclopentadienyl)zirconium-diamide, Dimethylsilylbis(pentamethylcyclopentadienyl) zirconiumdibenzyl, Dimethylsilylbis(cyclopentadienyl) (pentamethylcyclopentadienyl)zirconiumdimethyl, Dimethylsilylbis(cyclopentadienyl)(pentamethylcyclopentadienyl)zirconiumdiamide, Dimethylsilylbis(cyclopentadienyl)(pentamethylcyclopentadienyl)zirconiumdibenzyl, Dimethylsilylbis(1-methyl,4-butylcyclopentadienyl)zirconiumdimethyl, Dimethylsilylbis(1-methyl,4-butylcyclopentadienyl)zirconiumdiamide, Dimethylsilylbis(1-methyl,4-butylcyclopentadienyl)zirconiumdimethoxide, Dimethylsilylbis(1-methyl,4-butylcyclopentadienyl)zirconiumdibenzyl, Dimethylsilylbis(1-methyl,4-ethylcyclopentadienyl)zirconiumdimethyl, Dimethylsilylbis(1-methyl,4-benzylcyclopentadienyl)zirconiumdimethyl, Dimethylsilylbis(1-methyl,3-butylcyclopentadienyl)zirconiumdimethyl, Dimethylsilylbis(1-methyl,3-n-propylcyclopentadienyl)zirconiumdimethyl, Dimethylsilylbis(1-methyl,3-iso-propylcyclopentadienyl)zirconiumdimethyl, Dimethylsilylbis(1,3-dimethylcyclopentadienyl)zirconium-dimethyl, Dimethylsilylbis(n-propylcyclopentadienyl)zirconiumdimethyl, Dimethylsilylbis(n-butylcyclopentadienyl) zirconiumdimethyl, Dimethylsilylbis(tert-butylcyclopentadienyl)zirconiumdimethyl, Dimethylsilylbis (benzylcyclopentadienyl)zirconiumdimethyl, Dimethylsilylbis(benzylcyclopentadienyl)(pentamethylcyclopentadienyl)zirconium-dimethyl, Dimethylsilylbis(propylcyclopentadienyl)(pentamethylcyclopentadienyl)zirconium-dimethyl, Dimethylsilylbis(propylcyclopentadienyl)(tetramethylcyclopentadienyl)zirconium-dimethyl, Dimethylsilylbis(tetramethyl,propylcyclopentadienyl)(pentamethylcyclopentadienyl)-zirconiumdimethyl, Dimethylsilylbis(tetramethyl,propylcyclopentadienyl)(cyclopentadienyl)zirconium-dimethyl, One of the advantages of the method disclosed is that in step (1) the extent of hydroxyl "capping" or reaction is seen to reach a level above which the amount of silylating agent is inert. Thus, one can control the amount of silylating agent required. Another advantage of the method disclosed is that the reaction steps (1), (2) and (3) along with an analysis measuring the extent of silylated hydroxyl groups enables one to select the catalyst composition that can provide high polymerization productivity. Another advantage of the method disclosed is the avoidance of a costly fluoridation step. Fluoridation is a costly step and potentially leads to undesired products being formed. In addition, one pot reactions, such as the present disclosure, greatly reduce the amount of filtration required in the various steps. Thus, it provides for a more cost effective preparation of the desired catalyst system.

The following examples illustrate the present disclosure and the advantages thereto without limiting the scope thereof.

EXAMPLES

Below is one example of the preparation of these catalyst systems. These procedures were used for each triethylsilane capping concentration. Other species within the range of the detailed description of the disclosure may work. FIGS. 1, 2, 3, and 4, attached hereto, are illustrative depictions of embodiments of this disclosure.

Example 1

Triethylsilyl Capping of 952x-$SiO_{2(600)}$

In a drybox, to a 100 ml Celstir flask equipped with an overhead magnetic stirrer was added ten grams of freshly dehydrated 952x-$SiO_2$ (600 C, 6 h) and approximately 30 ml of anhydrous toluene. While stirring the slurry at room temperature, triethylsilane (0.320 ml, 0.2 mmole/g $SiO_2$ was added via microliter syringe, followed by a catalytic amount (0.050 g, 0.098 mmol) of tris(perfluorophenyl)boron as a toluene solution (~0.050 g/2 ml toluene). Immediately upon addition of the tris(perfluorophenyl)boron, the evolution of hydrogen was observed. The reaction mixture was heated to 80° C. for three hours. The slurry was filtered using a fitted funnel, and the support was washed with toluene (3×15 ml) and dried in vacuo overnight (~15 hr). The dried supports were submitted for carbon analysis and immediately used. A graph of anchored silane on 952x-$SiO_2$ (as determined by the % carbon of the support versus the amount of triethylsilane offered) is shown in FIG. 1. In particular, the amount of silane that "caps" the chemically accessible surface hydroxyls depends on the amount of silane introduced, but does have a limiting amount under the reaction conditions employed. For example, the treatment of 952x-$SiO_2$, dehydrated at 600° C., with varying amounts of triethylsilane (i.e., 0.2, 0.4, 0.6 and 0.8 mmol $Et_3SiH/g$ $SiO_2$) reveals that virtually all of the triethylsilane is chemically bound to the surface at the lower silane concentrations (i.e., 0.2 and 0.4 mmol), but at the higher silane concentrations some silane remains unreacted. Thus, the data in FIGS. 1 and 2 suggests that the maximum amount of triethylsilane that can be anchored is approximately 0.6 mmol/g $SiO_2$ for this particular example.

Example 2

Figure 3:
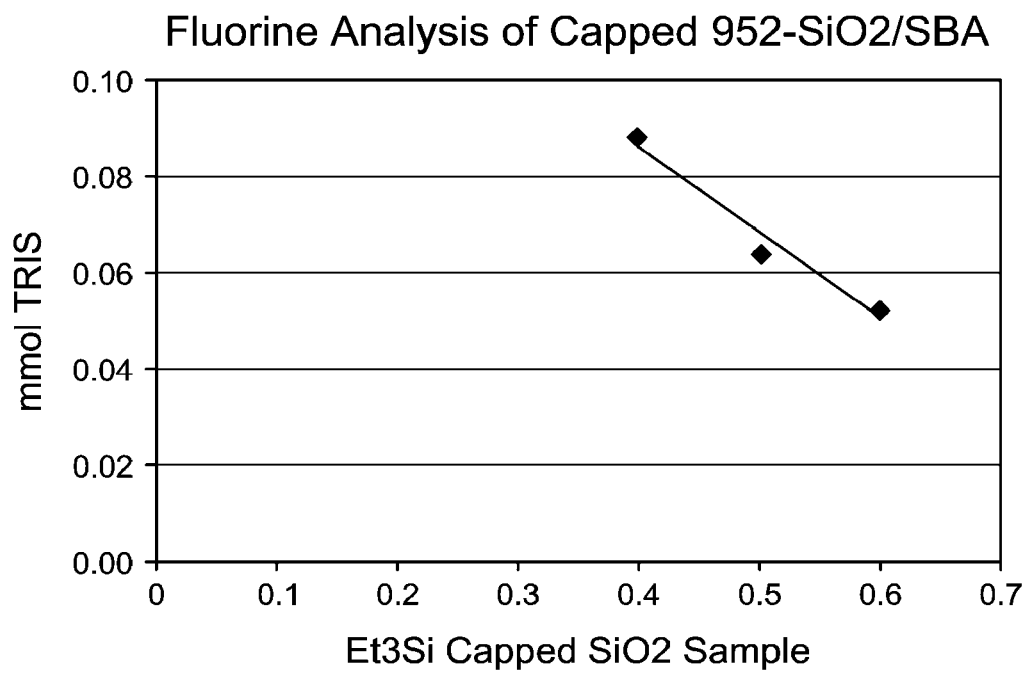
FIG. 3 is a graph of mmol TRIS (tris(perfluorophenyl) boron) versus $Et_3Si$-capped $SiO_2$ sample.
Figure 4:
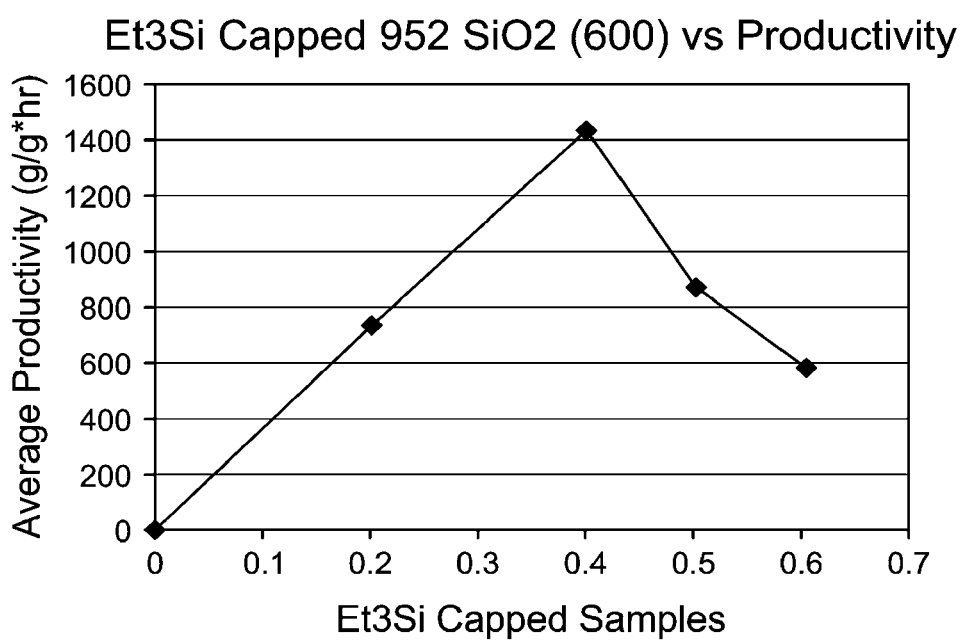
FIG. 4 is a graph plotting Average PP Productivity versus Activated Catalyst Supported on Varying Amounts of Silyl-Capped Supported Activators.

Preparation of the Triethylsilyl-Capped Silica-Bound Anion of 952x-$SiO_{2(600)}$ In a drybox, to a 100 ml Celstir flask equipped with an overhead magnetic stirrer was added 5.0 grams of the trimethylsilyl-capped 952x-$SiO_{2(600)}$ from example 1 and approximately 20 ml of anhydrous toluene. While stirring the slurry at room temperature, tris(perfluorophenyl)boron (0.256 g, 0.1 mmole/g $SiO_2$) was added as a toluene solution, followed by the addition of diethylaniline (0.082 ml, 0.52 mmol). The reaction mixture was allowed to stir at room temperature for approximately three hours. The slurry was filtered using a fritted funnel, and the support was washed with toluene (3×15 ml) and dried in vacuo overnight (approximately 15 hours). The dried supports were submitted for carbon and fluorine analysis and immediately used. A graph of the fluorine analysis of the silyl-capped 952x-$SiO_2$ as a function of extent of silyl-capping is shown in FIG. 3, wherein each of the supports were prepared and analyzed by fluorine elemental analysis to calculate the amount of tris(perfluorophenyl)boron (TRIS) actually anchored. The results are summarized in FIG. 3. The data suggests that the higher the silane capping the lower the amount of tris(perfluorophenyl)boron that is anchored.

Example 3

Preparation of Activated Metallocene

In a drybox, to a 100 ml Celstir flask equipped with an overhead magnetic stirrer was added 5.0 grams of the triethylsilyl-capped silica-bound anion 952x-$SiO_{2(600)}$ supported activator from Example 2 and approximately 20 ml of anhydrous toluene. To this slurry was added rac-dimethylsilylbis[(2-methyl-4-phenyl)indenyl]zirconium-dimethyl (0.044 g, approximately 15 μmol/g $SiO_2$) as a toluene solution/slurry. Upon addition of rac-dimethylsilylbis[(2-methyl-4-phenyl) indenyl]zirconiumdimethyl, the color of the support turned red/orange. The slurry was allowed to stir at room temperature for an additional 12 hours, at which time the volatiles were removed in vacuo, and the solid catalyst was dried under vacuum for an addition 12 hours. The solid catalyst was immediately slurried in mineral oil (typically 10 wt %), for future polymerization studies.

Example 4

Polymerization Process for Polypropylene in Lab Reactor

All polymerizations were conducted in a 2-liter autoclave, utilizing either a 1 M solution of triethylaluminum, or neat triethylaluminum as a scavenger, and 1250 ml propylene as the monomer. All polymerizations were conducted at 70° C. for one hour. Unless noted otherwise, hydrogen was introduced into the autoclave using a 50 cc gas vessel pressurized to 30 psig prior to the introduction of propylene. Only after the scavenger, hydrogen and propylene were introduced into the autoclave and the autoclave heat to 70° C. was the catalyst introduced as a 10 wt % slurry in mineral oil by pushing the slurry into the reactor with liquid propylene. Unless noted otherwise, approximately 0.050 g of the catalyst was employed and all metallocene loadings were 0.015 mmol/g support. The polymerization results are summarized in FIG. 4.

Applicants have attempted to disclose all embodiments and applications of the disclosed subject matter that could be reasonably foreseen. However, there may be unforeseeable, insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description. All patents and other documents cited herein, including priority documents, are fully incorporated by reference to the extent such disclosure is not inconsistent with this disclosure and for all jurisdictions in which such incorporation is permitted. When numerical lower limits and numerical upper limits are listed herein, ranges from any lower limit to any upper limit are contemplated.

What is claimed is:

1. A polymerization process comprising contacting one or more monomers polymerizable by coordination polymerization under suitable polymerization conditions with a polymerization catalyst formed by a method comprising:
   reacting a metal oxide support, selected from the group consisting of: silica, fumed silica, alumina, silica-alumina, magnesia, titania, zirconia, montmorillonite, phyllosilicate, zeolites, talc, clays, silica-chromium, silica-titania, aerogels, spherulites, and mixtures thereof, with at least one silane compound having the general formula: $H_xSi(R)_{4-x}$, wherein x is at least 1; and R is a hydrido, alkyl, aryl, heteroalkyl, or heteroaryl ligand, in the presence of a first Lewis acid, thereby generating a silyl capped support;
   reacting said silyl capped support with a second Lewis acid, which may be the same or different as said first Lewis acid, and an amine, thereby forming a supported silyl-capped silica-bound anion activator; and
   reacting said supported silyl-capped silica-bound anion activator with at least one catalyst precursor, thereby forming said polymerization catalyst.

2. The process according to claim 1, wherein the reaction of said metal oxide support with said silane is catalyzed at a temperature in the range between 0 to 120° C. for a time period in the range between 0.1 to 10 hours.

3. The process according to claim 1, wherein the reaction of said metal oxide support with said silane is conducted in the presence of a solvent.

4. The process according to claim 1, wherein x is 2, 3 or 4.

5. The process according to claim 1, wherein said silane compound is trialkylsilane.

6. The process according to claim 1, wherein said silyl capped support comprises a trialkylsilyl content of between 1 to 99% of the available surface hydroxyl groups.

7. The process according to claim 1, wherein the reaction of said silyl capped support with a Lewis acid and said amine is conducted at temperature in the range between −80 to 150° C. for a time period in the range between 5 minutes to 24 hours.

8. The process according to claim 1, wherein the reaction of said silyl capped support with a Lewis acid and said amine is conducted in the presence of a solvent.

9. The process according to claim 1, wherein said first and/or second Lewis acid is an acid having the general formula:

$R_xB(ArHal)_{3-x}$, where x can equal 0, 1, 2, or 3; R is a monoanionic ligand; B is boron; and ArHal is a halogenated $C_6$ aromatic or higher carbon number polycyclic aromatic hydrocarbon or aromatic ring assembly in which two or more rings or fused ring systems are joined directly to one another or together.

10. The process according to claim 1, wherein said amine is any amine that deprotonates a surface hydroxyl.

11. The process according to claim 1, wherein said supported silyl-capped silica-bound anion activator is a trialkyl-silyl-capped silica-bound anion.

12. The process according to claim 1, wherein said metal oxide support is silica.

13. The process according to claim 1, wherein said catalyst precursor is chosen from any olefin polymerization catalyst precursor.

14. The process according to claim 1, wherein said support is chosen from: silica, fumed silica, alumina, silica-alumina, magnesia, titania, zirconia, silica-chromium, silica-titania, and mixtures thereof.

15. A polymerization process comprising contacting one or more monomers polymerizable by coordination polymerization under suitable polymerization conditions with a polymerization catalyst formed by the method comprising:

reacting a metal oxide support with at least one silane compound having the general formula: $H_xSi(R)_{4-x}$, wherein x is 1; and R is a hydrido, alkyl, aryl, heteroalkyl, or heteroaryl ligand, in the presence of a first Lewis acid, thereby generating a silyl capped support;

reacting said silyl capped support with a second Lewis acid, which may be the same or different as said first Lewis acid, and an amine, thereby forming a supported silyl-capped silica-bound anion activator; and reacting said supported silyl-capped silica-bound anion activator with at least one catalyst precursor, thereby forming said polymerization catalyst, wherein said first and/or second Lewis acid is an acid having the general formula:

$R_xB(ArHal)_{3-x}$, where x can equal 0, 1, 2, or 3; R is a monoanionic ligand; B is boron; and ArHal is a halogenated $C_6$ aromatic or higher carbon number polycyclic aromatic hydrocarbon or aromatic ring assembly in which two or more rings or fused ring systems are joined directly to one another or together.

16. The process according to claim 1, wherein said amine is any amine that deprotonates a surface hydroxyl.

17. The process according to claim 1, wherein said supported silyl-capped silica-bound anion activator is trialkylsilyl-capped silica-bound anion.

18. The process according to claim 1, wherein all reactions are conducted in a single reaction vessel.

19. The process of claim 1, wherein the silane is selected from the group consisting of: methylsilane, dimethylsilane, trimethylsilane, ethylsilane, diethylsilane, propylsilane, di(n-propyl)silane, tri(n-propyl)silane, phenylsilane, diphenylsilane, triphenylsilane, diethylphenylsilane, ethyldiphenylsilane, diethylperfluorophenylsilane, and trisperfluorophenylsilane.

20. The process of claim 1, wherein the monomer is propylene.

21. The process of claim 1, wherein the polymerization catalyst is selected from the group consisting of rac-dimethylsilyl-bis(indenyl)hafniumdimethyl, rac-dimethylsilyl-bis(indenyl)zirconiumdimethyl, rac-dimethylsilyl-bis(2-methyl-4-phenyl-indenyl)hafniumdimethyl, rac-dimethylsilyl-bis(2-methyl-4-phenyl-indenyl)zirconiumdimethyl, rac-dimethylsilyl-bis(2-methyl-benzindenyl)hafniumdimethyl, rac-dimethylsilyl-bis(2-methyl-benzindenyl)zirconiumdimethyl, rac-dimethylsilyl-bis-(2-methyl-indenyl)zirconiumdimethyl, rac-dimethylsilyl-bis-(2-methyl-indenyl)hafniumdimethyl, rac-dimethylsilyl-bis(2-methyl-4-naphthyl-indenyl)hafniumdimethyl, rac-dimethylsilyl-bis(2-methyl-4-naphthyl-indenyl)zirconiumdimethyl, rac-ethylene-bis(indenyl)hafniumdimethyl, rac-ethylene-bis(indenyl)zirconiumdimethyl, rac-dimethylsilyl-bis(2-methyl-4-(2'-methyl-phenyl)-indenyl)hafniumdimethyl, rac-dimethylsilyl-bis(2-methyl-4-(2'-methyl-phenyl)-indenyl)zirconiumdimethyl, rac-dimethylsilyl-bis(2-methyl-4-(4'-methyl-phenyl)-indenyl)hafniumdimethyl, rac-dimethylsilyl-bis(2-methyl-4-(4'-methyl-phenyl)-indenyl)zirconiumdimethyl, rac-dimethylsilyl-bis(2-methyl-4-(4'-tert-butyl-phenyl)-indenyl)hafniumdimethyl, rac-dimethylsilyl-bis(2-methyl-4-(4'-tert-butyl-phenyl)-indenyl)zirconiumdimethyl, rac-dimethylsilyl-bis(2-methyl-4-(4'-tert-butyl-phenyl)-indenyl)hafniumdimethyl, rac-dimethylsilyl-bis(2-methyl-4-(4'-tert-butyl-phenyl)-indenyl)zirconiumdimethyl, rac-dimethylsilyl-(2-methyl-4-(4'-tert-butyl-phenyl)-indenyl)(2-isopropyl-4-(4'-tert-butyl-phenyl)-indenyl)hafniumdimethyl, rac-dimethylsilyl-(2-methyl-4-(4'-tert-butyl-phenyl)-indenyl)(2-isopropyl-4-(4'-tert-butyl-phenyl)-indenyl)zirconiumdimethyl, rac-dimethylsilyl-bis(2-methyl-4,6-diisopropyl-indenyl)hafniumdimethyl, rac-dimethylsilyl-bis(2-methyl-4,6-diisopropyl-indenyl)zirconiumdimethyl, Bis(cyclopentadienyl)zirconiumdimethyl, Bis(pentamethylcyclopentadienyl)zirconiumdimethyl, Bis(cyclopentadienyl)(pentamethylcyclopentadienyl)zirconiumdimethyl, Bis(1-methyl,4-butylcyclopentadienyl)zirconiumdimethyl, Bis(1-methyl,4-butylcyclopentadienyl)zirconiumdibenzyl, Bis(1-methyl,4-butylcyclopentadienyl)zirconiumdiamide, Bis(1-methyl,4-ethylcyclopentadienyl)zirconiumdimethyl, Bis(1-methyl,4-benzylcyclopentadienyl)zirconiumdimethyl, Bis(1-methyl,3-butylcyclopentadienyl)zirconiumdimethyl, Bis(1-methyl,3-n-propylcyclopentadienyl)zirconiumdimethyl, Bis(1-methyl,3-iso-propylcyclopentadienyl)zirconiumdimethyl, Bis(1,3-dimethylcyclopentadienyl)zirconiumdimethyl, Bis(n-propylcyclopentadienyl)zirconiumdimethyl, Bis(n-propylcyclopentadienyl)zirconiumdiamide, Bis(n-propylcyclopentadienyl)zirconiumdibenzyl, Bis(n-propylcyclopentadienyl)hafniumdimethyl, Bis(n-propylcyclopentadienyl)hafniumdiamide, Bis(n-propylcyclopentadienyl)hafniumdibenzyl, Bis(n-propylcyclopentadienyl)hafniumdimethoxide, Bis(n-butylcyclopentadienyl)zirconiumdimethyl, Bis(tert-butylcyclopentadienyl)zirconiumdimethyl, Bis(benzylcyclopentadienyl)zirconiumdimethyl, Bis(benzylcyclopentadienyl)(pentamethylcyclopentadienyl)zirconiumdimethyl, Bis(propylcyclopentadienyl)(pentamethylcyclopentadienyl)zirconiumdimethyl, Bis(propylcyclopentadienyl)(tetramethylcyclopentadienyl)zirconiumdimethyl, Bis(tetramethyl,propylcyclopentadienyl)(pentamethylcyclopentadienyl)zirconium-dimethyl, Bis(tetramethyl,propylcyclopentadienyl)(cyclopentadienyl)zirconiumdimethyl, Dimethylsilylbis(cyclopentadienyl)zirconiumdimethyl, Dimethylsilylbis(cyclopentadienyl)zirconiumdiamide, Dimethylsilylbis(pentamethylcyclopentadienyl)zirconiumdimethyl, Dimethylsilylbis(pentamethylcyclopentadienyl)zirconiumdiamide, Dimethylsilylbis(pentamethylcyclopentadienyl)zirconiumdibenzyl, Dimethylsilylbis(cyclopentadienyl)(pentamethylcyclopentadienyl)zirconiumdimethyl, Dimethylsilylbis(cyclopentadienyl)(pentamethylcyclopentadienyl)zirconiumdiamide, Dimethylsilylbis(cyclopentadienyl)(pentamethylcyclopentadienyl)zirconiumdibenzyl, Dimethylsilylbis(1-methyl,4-butylcyclopentadienyl)zirconiumdimethyl, Dimethylsilylbis(1-methyl,4-butylcyclopentadienyl)zirconiumdiamide, Dimethylsilylbis(1-methyl,4-butylcyclopentadienyl)zirconiumdimethoxide, Dimethylsilylbis(1-methyl,4-butylcyclopentadienyl)zirconiumdibenzyl, Dimethylsilylbis(1-methyl,4-ethylcyclopentadienyl)zirconiumdimethyl, Dimethylsilylbis(1-methyl,4-benzylcyclopentadienyl)zirconiumdimethyl, Dimethylsilylbis(1-methyl,3-butylcyclopentadienyl)zirconiumdimethyl, Dimethylsilylbis(1-methyl,3-n-propylcyclopentadienyl)zirconiumdimethyl, Dimethylsilylbis(1-methyl,3-iso-propylcyclopentadienyl)zirconiumdimethyl, Dimethylsilylbis(1,3-dimethylcyclopentadienyl)zirconiumdimethyl, Dimethylsilylbis(n-propylcyclopentadienyl)zirconiumdimethyl, Dimethylsilylbis(n-butylcyclopentadienyl)zirconiumdimethyl, Dimethylsilylbis(tert-butylcyclopentadienyl)zirconiumdimethyl, Dimethylsilylbis(benzylcyclopentadienyl)zirconiumdimethyl, Dimethylsilylbis(benzylcyclopentadienyl)(pentamethylcyclopentadienyl)zirconium-dimethyl, Dimethylsilylbis(propylcyclopentadienyl)(pentamethylcyclopentadienyl)zirconium-dimethyl, Dimethylsilylbis(propylcyclopentadienyl)(tetramethylcyclopentadienyl)zirconium-dimethyl, Dimethylsilylbis(tetramethyl,propylcyclopentadienyl)(pentamethylcyclopentadienyl)-zirconiumdimethyl, and Dimethylsilylbis(tetramethyl,propylcyclopentadienyl)(cyclopentadienyl)zirconium-dimethyl.

22. The process of claim 1, wherein the polymerization catalyst is selected from the group consisting of: rac-dimethylsilyl-bis(2-methyl-4-phenyl-indenyl)hafniumdimethyl, and rac-dimethylsilyl-bis(2-methyl-4-phenylindenyl)zirconiumdimethyl.

* * * * *